METHOD OF MANUFACTURING FERRITE RECORDING HEADS
WITH A MULTIPURPOSE DEVITRIFIABLE GLASS
Filed July 6, 1970

INVENTORS.
JAMES F. RUSZCZYK
DUANE R. SECRIST

BY Melvyn David Silver
AGENT

United States Patent Office 3,681,044
Patented Aug. 1, 1972

3,681,044

METHOD OF MANUFACTURING FERRITE RECORDING HEADS WITH A MULTIPURPOSE DEVITRIFIABLE GLASS

James F. Ruszczyk and Duane R. Secrist, San Jose, Calif., assignors to International Business Machines Corporation, Armonk, N.Y.

Filed July 6, 1970, Ser. No. 52,352
Int. Cl. C03c *27/00*
U.S. Cl. 65—33 6 Claims

ABSTRACT OF THE DISCLOSURE

A glassing method for joining a ferrite recording head to a ceramic slider by the steps of filling the recording head gap with a devitrifiable glass and crystallizing the glass so as to effectively raise its softening point and hardness; adding a second glass material to the slider area to which the head is to be joined, placing the head in contact with the slider, and heating the second glass material to a temperature sufficient to join the head to the slider. The slider glass material is preferably also the same devitrifiable glass material as used with the head, and may be heated to the devitrifying temperature. This latter scheme allows one glass system to be employed for multistep processes at one common low temperature. Reduced corrosion and improved wear characteristics are realized.

FIELD OF THE INVENTION

This invention relates to a magnetic head assembly and glassing methods of joining ceramic materials to each other whereby similar or dissimilar ceramic materials are joined by the intermediary use of glasses which are compatible with each other and/or with the ceramic materials involved.

BACKGROUND OF THE INVENTION

It is common practice to join ceramic parts to each other by use of an intermediary medium such as a glassing material. A single glass material may be utilized where it is compatible with each of the ceramic materials involved. Alternatively, glass materials compatible with each other where each is separately compatible with an individual ceramic but not necessarily with both materials may also be used.

The glassing materials chosen in the electronics art are usually designed to have matching coefficients of thermal expansion. This is the case especially where the ceramic parts to be joined are, for example, magnetic recording heads housed in recording head sliders as might be utilized in disk drive computer units. Slight differences in the coefficient of thermal expansion can cause severe cracking and damage problems upon any moderate change of temperature. It is thus desirable to have as closely compatible or matched system of glasses and ceramics as is feasible.

Current practice in the magnetic recording arts is to utilize epoxy materials as at least one of the binding materials in place of using an all-glass system. The use of epoxy materials has its own inherent disadvantages in handling, toxicity, and instability with respect to temperature and moisture.

An object of this invention is a glassing method for use in joining a ceramic magnetic recording head material to a ceramic support material.

Another object of this invention is a glassing composition compatible with the objects above.

A further object of this invention is the utilization of devitrifiable glass materials to achieve thermal coefficient of expansion matching of the glass and ceramic recording head materials.

Still another object is the utilization of devitrifiable glass materials to allow large differences in the softening point of the glass materials used in joining recording head parts so as to maintain dimensional stability of one glass material when working in the softening region of the other glass material.

It is a particular object of this invention to maintain ceramic recording head gap spacing stability by using and crystallizing a devitrifiable glass as the gap spacer material while joining the ceramic head to a ceramic slider with a lower softening point glass material.

SUMMARY OF THE INVENTION

These and other objects are met by the method of this invention. Briefly stated, in one embodiment this invention comprises a glassing process for joining of recording head parts comprising the steps of applying a first devitrifiable glass material to at least a first area of the first ceramic part to be joined, and heating the part to a temperature sufficient to cause crystallization of the glass material. Then, a second glass material is applied to at least a first area of a second ceramic part to be joined to the first ceramic part. The two parts are placed in contact, optionally with the glass areas of each part contacting each other. The parts are then heated to a temperature and for a time sufficient to bind these first areas to each other.

The second glass material can be and is preferably of the same devitrifiable composition as the crystallizable glass used with the first ceramic part. This allows the option of crystallizing the second glass during the joining step by joining at a high temperature or heating to a lower temperature and joining without crystallization, as desired. The crystallized glass has a higher softening point due to the crystallized characteristics of the glass than does the same composition in an unrecrystallized state. This allows the flexibility of matching coefficient of thermal expansion while not disturbing the first glassing operation. If for example, the first glassing operation were utilized to join two different parts together to form the first ceramic part, then dimensional stability of the first crystallized glass is maintained during the second joining step as softening of the first crystallized glass does not occur.

This invention will best be understood when read in conjunction with the accompanying drawings and general specifications.

In the drawings

GENERAL DESCRIPTION

This invention is best understood by use of an example, the joining of a ceramic magnetic recording head to a ceramic slider material. It will be clear however that the general method described is applicable to the joining of recording head parts generally.

Figure 1:
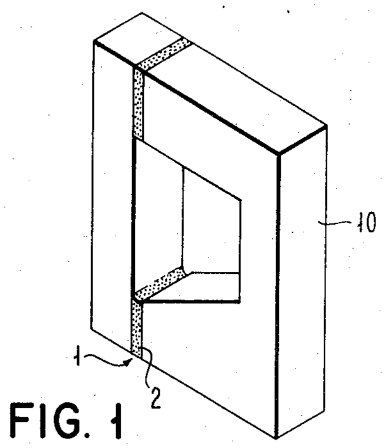
FIG. 1 is a view of a magnetic recording head showing crystallizable glass as the gap material.

FIG. 1 shows a magnetic recording head having a gap area 1. This gap area is conventionally filled with a glass material 2. According to the method of this invention, a crystallizable glass is utilized as the gap material. The gap may be filled by capillary soaking or other methods well-known in the art. Upon filling, the glass is heated to a temperature and held for a time to cause crystallization of the glass material. For example, the glass material utilized may be approximately by weight 15% silica, 73% lead monoxide, 6% boron oxide, and 5% aluminum oxide, with the substitution of 3 to 15% titanium dioxide as a nucleation agent. A preferred composition would be, by weight, 13.8% $SOi_2$, 66.7%, PbO, 5.7% $B_2O_3$, 4.6% $Al_2O_3$ and 9.2% $TiO_2$.

When using this glass, capillary soaking to fill the gap and subsequent crystallization occurs after about one hour at 800° C. The effect of crystallization is to raise the softening point of the glass. After crystallization occurs, the glass gap exhibits higher temperature ceramic properties which permits the same parent glass to be used for bonding the finished head into a slider housing. If desirable, as will be seen below, the second joining glass can also be crystallized to yield improved wear and chip resistance during subsequent slider processing.

Figure 2:
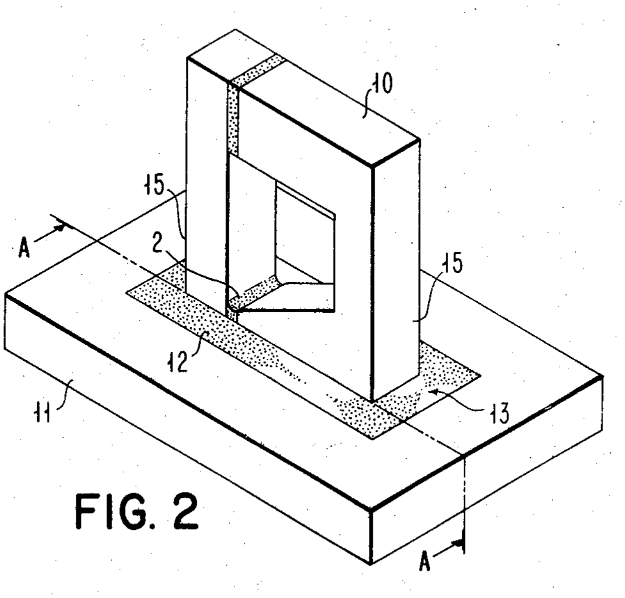
FIG. 2 is a view of the magnetic recording head of FIG. 1 set into an area of a slider material as would be used for magnetic recording purposes.

FIG. 2 shows the ceramic recording head 10 in position within a slider 11 housing. Glass 12 has been applied to the open slider housing area 13.

Glass 12, compatible with head material 10 and slider material 11, may be used to align and hold head 10 in position with slider 11 by just making contact at the end areas 15 of head 10, for example.

The glassed areas are now brought to a temperature, approximately 600–700° C., and held for a time sufficient to cause bonding between ceramics 10 and 11.

Figure 3:
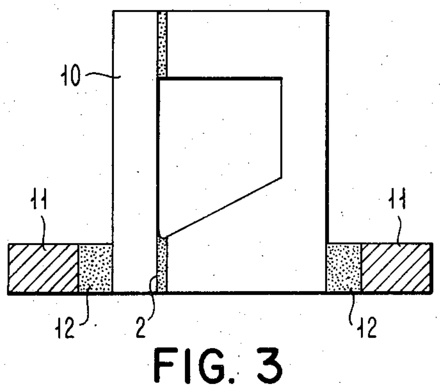
FIG. 3 is a cross-setcional view taken through the area shown in FIG. 2, showing the glass areas.

FIG. 3 is the section taken through AA of FIG. 2. This shows the glass gap area 2 of the recording head surrounded by and contacting the glass 12 of the slider 11.

By use of crystallized glass 2 for gap spacing 1, this gap spacing integrity has been maintained during the lower temperature joining by use of glass 12.

As is evident from FIGS. 2 and 3, thermal mismatch of the materials could very easily lead to cracking of the glasses. It is important for the maintenance of gap spacing and head integrity to avoid this cracking. Thus, if the proper glasses are used, thermal expansion coefficient problems do not exist. The following options exist: After crystallizing the gap glass 2, the slider glass 12 may be also crystallized during or after the lower temperature joining the head 10 to the slider 11.

Alternatively, the same composition glass as used for the gap 2 may be used for the area 13, but with joining occurring at a lower temperature and no further crystallizing step. The compatibility of the glasses allows joining, and crystallization does not occur at the lower temperature. Alternatively, glass 12 may be of the same composition as that of recrystallizable glass 2 with the exception that the nucleating agent is not present. Or, a different crystallizable glass may be used.

The materials commonly used for recording heads are nickel zinc ferrite materials, and for the slider, the barium titanate class of materials. These materials are completely compatible with the glasses listed previously.

Thus, while this invention has been discussed in terms of the joining of a magnetic recording head to its mating slider, it is clear that the joining of other recording head parts of similar or dissimilar material can be done by use of the crystallizable glass joining method discussed above.

What is claimed is:

1. A glassing process for the joining of ceramic recording head parts comprising the steps of:

applying a crystallizable glass material between two areas of a magnetic ferrite core material and heating to a temperature and for a time sufficient to join the two areas and crystallize the glass material to define a crystallized glass gap between the two areas of the ferrite material;

applying the same crystallizable glass material as used to define the gap, between a selected area of the magnetic ferrite material and a ceramic slider body and heating to a temperature less than the softening point of the crystallized glass defining the crystallized glass gap and for a time sufficient to join the ferrite material to the ceramic material, whereby a recording head assembly part is formed having a glass core gap and core-ceramic bonding glass with matched thermal expansion coefficients.

2. A glassing process for the joining of ceramic recording head parts comprising the steps of:

applying a crystallizable glass material consisting of $SiO_2$, PbO, $B_2O_3$, $Al_2O_3$, and $TiO_2$ between two areas of a nickel-zinc ferrite core material and heating to a temperature and for a time sufficient to join the two areas and to crystallize the glass material to define a crystallized glass gap between the two areas of the nickel-zinc ferrite core material;

applying the same crystallizable glass material as used to define the gap between a selected area of the nickel zinc ferrite material and a ceramic slider body and heating to a temperature less than the softening point of the crystallized gap glass and for a time sufficient to join the ferrite material to the ceramic material, whereby a recording head assembly part is formed having a glass core gap and core ceramic slider bonding glass with matched thermal expansion coefficient.

3. The method of claim 2 wherein the crystallization temperature is approximately 800° C. and the time is approximately one hour.

4. The method of claim 2 wherein the glass composition consists essentially of, by weight, 15% $SiO_2$, 73% PbO, 6% $B_2O_3$, 5% $Al_2O_3$ and 3–15% $TiO_2$.

5. The method of claim 2 wherein the glass composition consists essentially of, by weight, 13.8% $SiO_2$, 66.7% PbO, 5.7% $B_2O_3$, 4.6% $Al_2O_3$, and 9.2% $TiO_2$.

6. The method of claim 2 wherein the ceramic slider body is of a barium titanate material.

References Cited

UNITED STATES PATENTS

| | | | |
|---|---|---|---|
| 3,577,634 | 5/1971 | Secrist | 29—603 |
| 3,458,926 | 8/1969 | Maissel et al. | 29—603 |
| 3,410,674 | 11/1968 | Martin | 65—43 X |
| 3,495,045 | 2/1970 | Varadi et al. | 179—100.2 |
| 3,577,191 | 5/1971 | Haertlein | 179—1.2 X |

ARTHUR D. KELLOGG, Primary Examiner

U.S. Cl. X.R.

29—603; 65—43